United States Patent
Francis

(10) Patent No.: US 10,353,504 B2
(45) Date of Patent: *Jul. 16, 2019

(54) USER INTERFACE FOR COMPUTING DEVICES EQUIPPED WITH PRESSURE-SENSITIVE DISPLAYS

(71) Applicant: Samsung Electronics Co., Ltd., Suwon-si, Gyeonggi-do (KR)

(72) Inventor: Thomas Francis, Dubuque, IA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

This patent is subject to a terminal disclaimer.

(21) Appl. No.: 14/970,492

(22) Filed: Dec. 15, 2015

(65) Prior Publication Data

US 2017/0068367 A1    Mar. 9, 2017

Related U.S. Application Data

(60) Provisional application No. 62/215,492, filed on Sep. 8, 2015.

(51) Int. Cl.
*G06F 3/01*    (2006.01)
*G06F 3/03*    (2006.01)
(Continued)

(52) U.S. Cl.
CPC .......... *G06F 3/0414* (2013.01); *G06F 3/0304* (2013.01); *G06F 3/038* (2013.01);
(Continued)

(58) Field of Classification Search
CPC ................... G06F 17/30554; G06F 3/0488
(Continued)

(56) References Cited

U.S. PATENT DOCUMENTS 8,209,628 B1 *   6/2012   Davidson .............. G06F 3/0487
                                                                715/790
9,575,591 B2 *   2/2017   Yang ..................... G06F 3/0481
(Continued)

OTHER PUBLICATIONS

How Apple's Force Touch could change the way you use your next iPhone or iPad; cnet.com; Aug. 17, 2015.
(Continued)

*Primary Examiner* — Cao H Nguyen
(74) *Attorney, Agent, or Firm* — Jefferson IP Law, LLP

(57) ABSTRACT

Techniques include receiving a user notification (e.g., a text-based notification, a phone call, or a voicemail) at a user device. The techniques further include receiving a pressure input from a user of the device at a pressure-sensitive display of the device and determining that the display is covered (e.g., obscured from the user's view). The techniques also include, in response to receiving the pressure input and determining that the display is covered, performing an action associated with the notification using the device (e.g., speak or playback the notification at the device, enable the user to vocally interact with the notification at the device, or forward the notification to another device for display, speech or playback output, and/or user vocal interaction). Additional techniques include, in response to receiving the pressure input and determining that the display is covered, setting the device into a predetermined state (e.g., of a software application).

28 Claims, 9 Drawing Sheets

(51) Int. Cl.

| | |
|---|---|
| *G06F 3/041* | (2006.01) |
| *G06F 3/038* | (2013.01) |
| *H04L 12/58* | (2006.01) |
| *G06F 16/242* | (2019.01) |
| *G06F 16/248* | (2019.01) |
| *G06F 16/25* | (2019.01) |
| *G06F 16/635* | (2019.01) |
| *G06F 16/638* | (2019.01) |
| *G06F 16/2455* | (2019.01) |
| *G06F 16/9032* | (2019.01) |
| *G06F 3/044* | (2006.01) |
| *H04M 1/725* | (2006.01) |
| *G06F 3/0488* | (2013.01) |

(52) U.S. Cl.
CPC .......... *G06F 3/044* (2013.01); *G06F 3/04883* (2013.01); *G06F 16/243* (2019.01); *G06F 16/248* (2019.01); *G06F 16/2455* (2019.01); *G06F 16/252* (2019.01); *G06F 16/635* (2019.01); *G06F 16/638* (2019.01); *G06F 16/90332* (2019.01); *H04L 51/046* (2013.01); *H04M 1/72519* (2013.01); *G06F 3/016* (2013.01); *H04M 2250/22* (2013.01)

(58) Field of Classification Search
USPC ................................................ 715/780, 790
See application file for complete search history.

(56) References Cited

U.S. PATENT DOCUMENTS

| | | |
|---|---|---|
| 2008/0294436 A1 | 11/2008 | Andreasson et al. |
| 2015/0242422 A1 | 8/2015 | Shapira et al. |
| 2015/0317320 A1 | 11/2015 | Miller et al. |
| 2016/0191446 A1 | 6/2016 | Grol-Prokopczyk et al. |

OTHER PUBLICATIONS

Apple Pegged to Bring Force Touch Pressure-Sensitive Input to Next iPhones; techcrunch.com; Mar. 11, 2015.
Is Apple Watch's Pressure-Sensitive Screen a Bigger Deal Than the Gadget Itself?; wired.com; Sep. 15, 2014.
U.S. Appl. No. 14/970,499, filed Dec. 15, 2015, Thomas Francis.
U.S. Appl. No. 15/245,761, filed Aug. 24, 2016, Thomas Francis.

\* cited by examiner

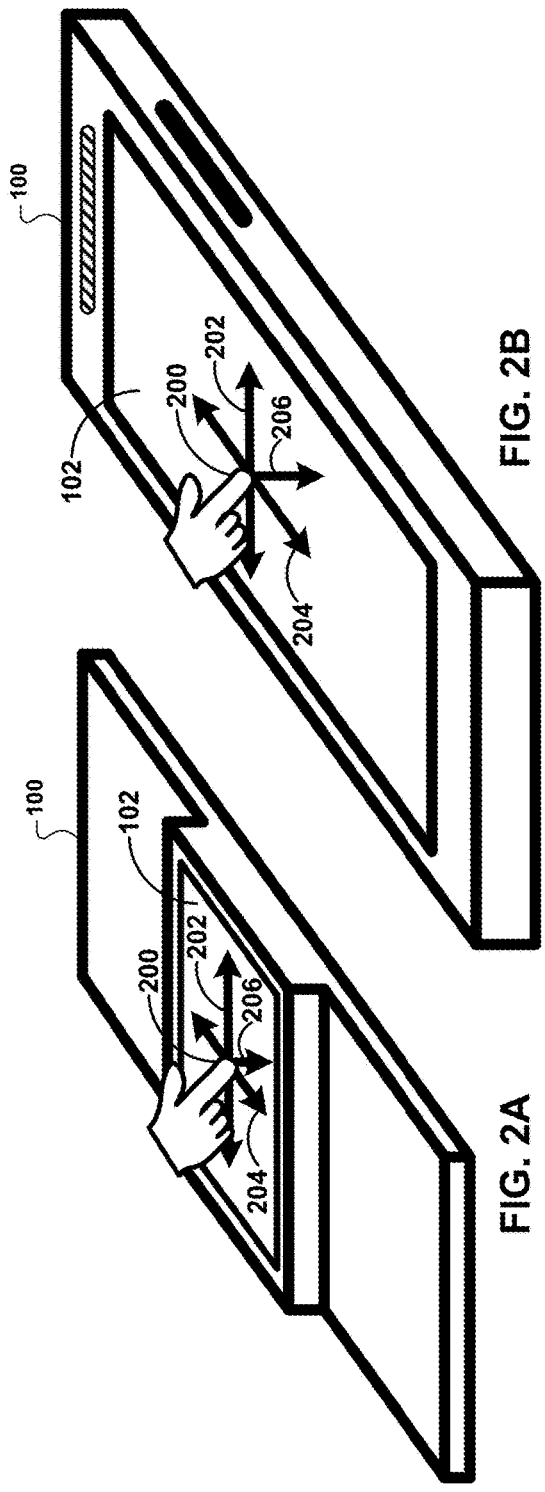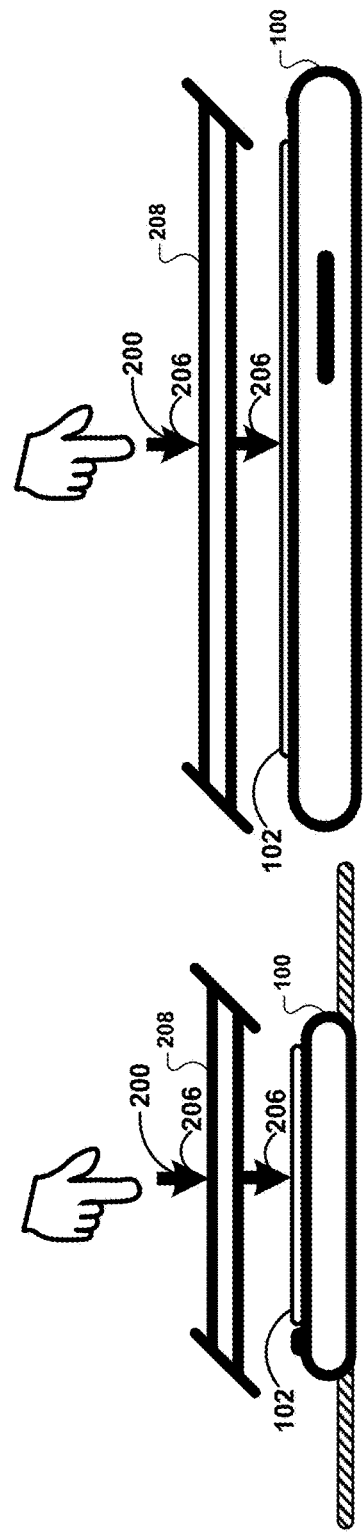

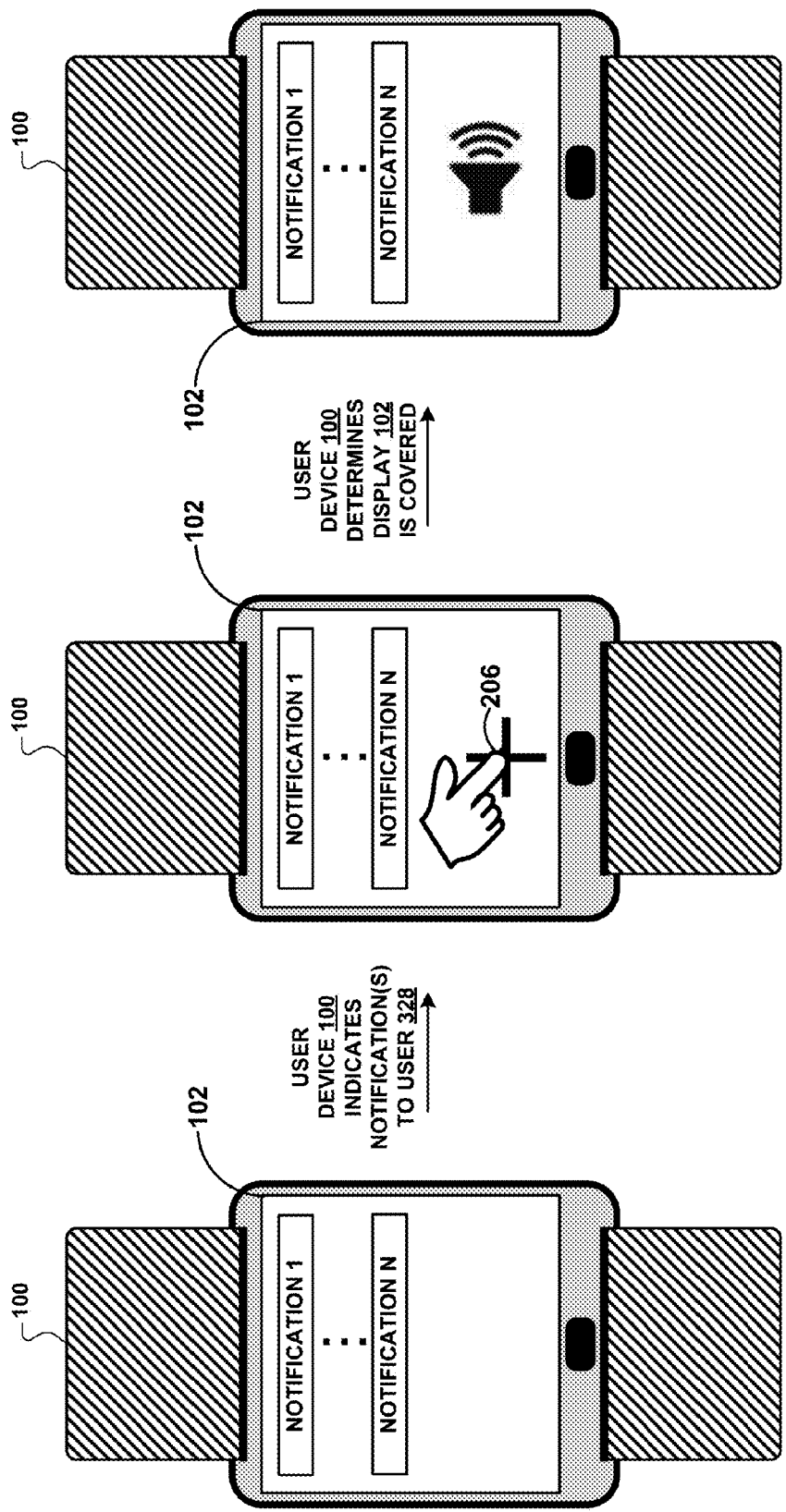

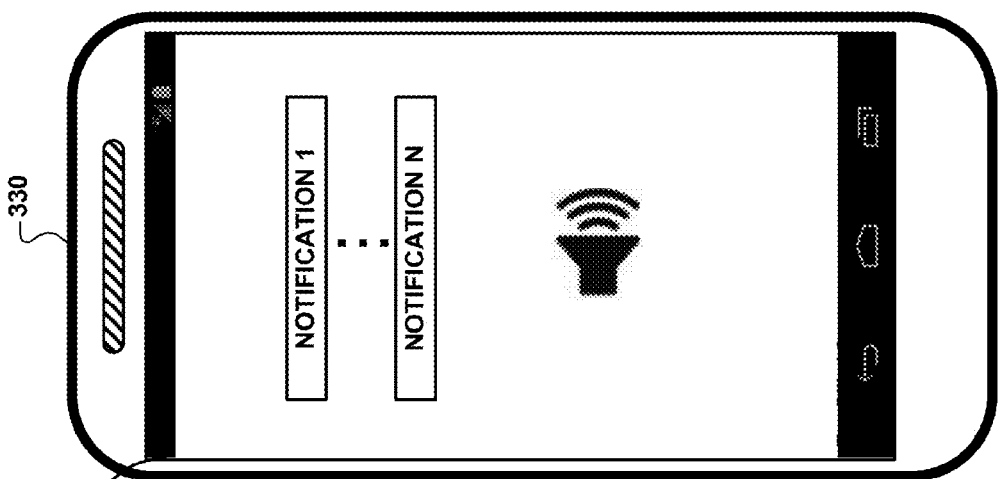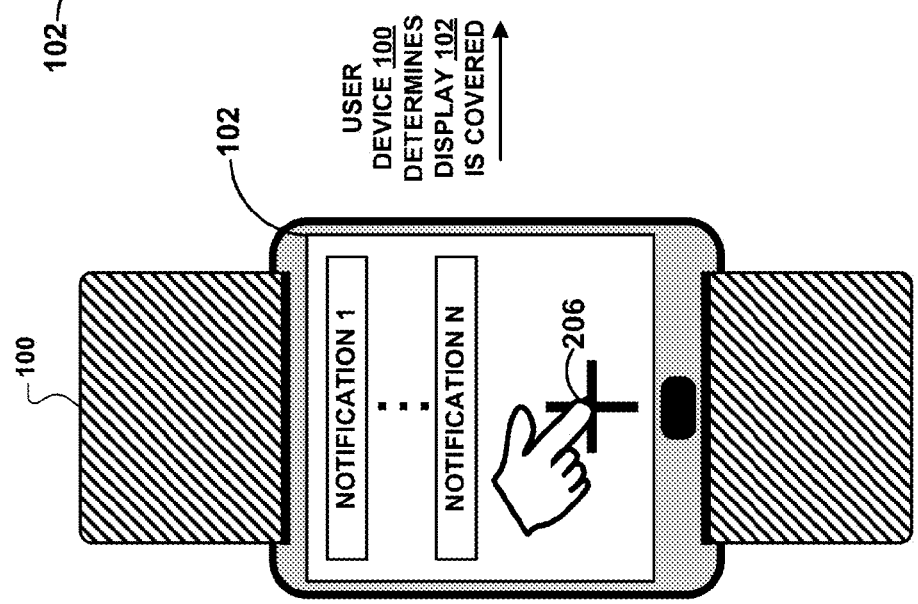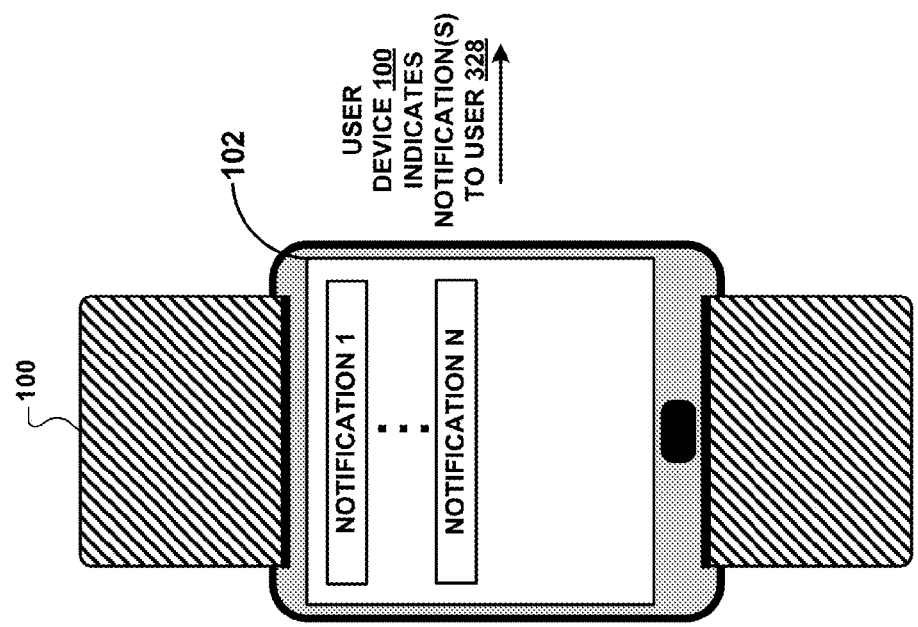
FIG. 6A
FIG. 6B
FIG. 6C

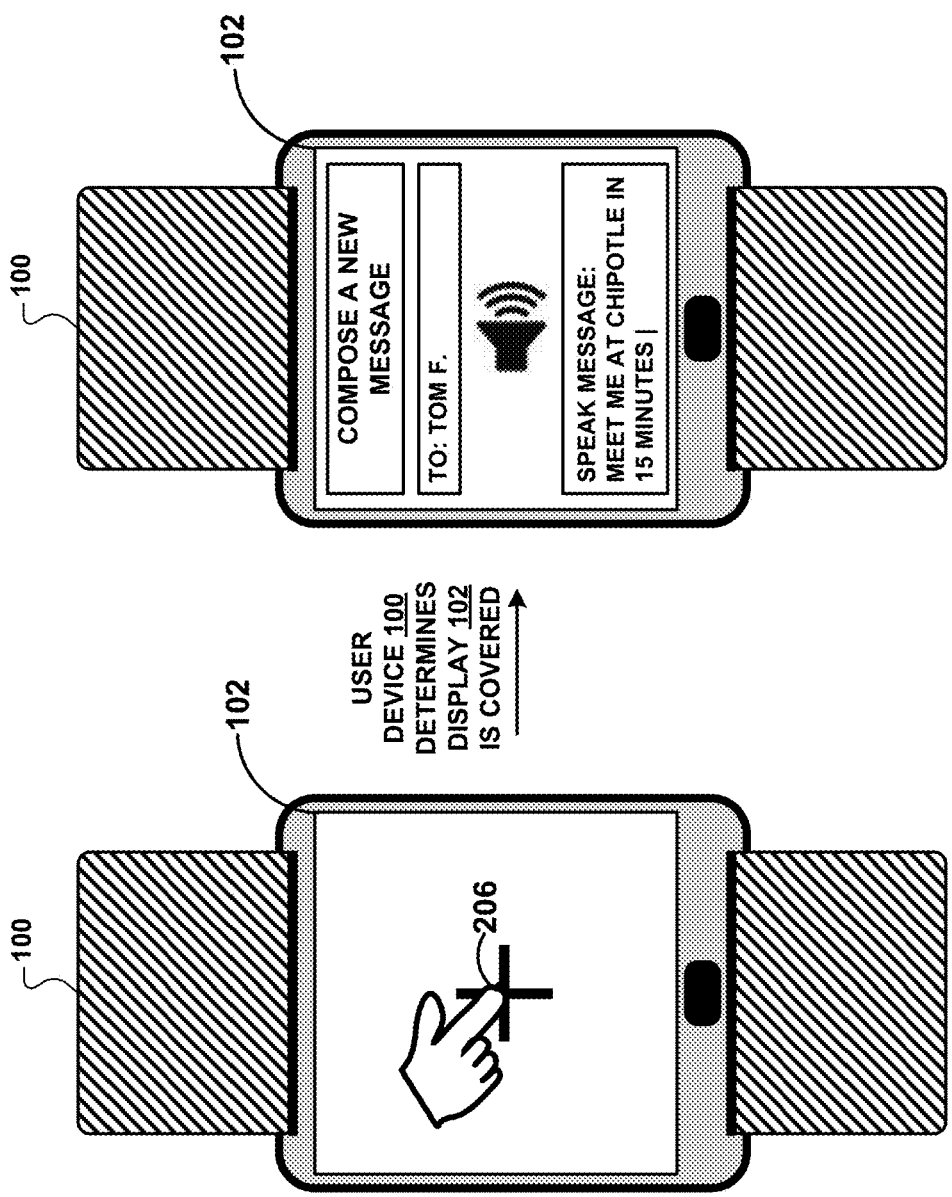

USER INTERFACE FOR COMPUTING DEVICES EQUIPPED WITH PRESSURE-SENSITIVE DISPLAYS

CROSS-REFERENCE TO RELATED APPLICATION

This application claims the benefit of U.S. Provisional Application No. 62/215,492 filed Sep. 8, 2015, which is hereby incorporated by reference in its entirety.

TECHNICAL FIELD

This disclosure generally relates to the field of computing devices, and more particularly to techniques for interacting with touchscreen-enabled computing devices.

BACKGROUND

In recent years, the use of computers, tablets, smartphones, smart watches, and other stationary and mobile computing devices has grown significantly. Additionally, the inclusion of various touchscreen technologies configured to receive user inputs at display screens of these and other computing devices has also increased. Today, many consumer and industrial computing devices and appliances are capable of receiving user inputs at display screens via any of a variety of different touchscreen technologies, including resistive, capacitive, surface-acoustic-wave (SAW), optical, acoustic, as well as any other touchscreen technologies or types.

SUMMARY

In one example, a computing device includes a network interface component configured to communicate with a network, a pressure-sensitive display configured to receive a pressure input from a user of the device, one or more memory components configured to store computer-readable instructions, and one or more processing units configured to execute the instructions. In this example, the computer-readable instructions, when executed by the processing units, cause the processing units to receive a user notification from the network via the network interface component, receive the pressure input from the user at the pressure-sensitive display subsequent to receiving the notification, determine that the display is covered, and, in response to receiving the input and determining that the display is covered, perform an action associated with the notification.

In another example, a computing device includes a pressure-sensitive display configured to receive a pressure input from a user of the device, one or more memory components configured to store computer-readable instructions, and one or more processing units configured to execute the instructions. In this example, the computer-readable instructions, when executed by the processing units, cause the processing units to receive the pressure input from the user at the pressure-sensitive display, determine that the display is covered, and, in response to receiving the input and determining that the display is covered, set the computing device into a predetermined state.

In another example, a method includes receiving a user notification from a network at a user device, receiving a pressure input from a user of the device at a pressure-sensitive display of the device subsequent to receiving the notification, determining that the display is covered using the device, and, in response to receiving the input and determining that the display is covered, performing an action associated with the notification using the device.

In another example, a method includes receiving a pressure input from a user of a user device at a pressure-sensitive display of the device, determining that the display is covered using the device, and, in response to receiving the input and determining that the display is covered, setting the device into a predetermined state.

BRIEF DESCRIPTION OF DRAWINGS

The details of one or more examples are set forth in the accompanying drawings and the description below. Other features, objects, and advantages will be apparent from the description and drawings, and from the claims.

FIGS. 2A-2D are conceptual diagrams of example user interactions with displays of user devices, consistent with the techniques of this disclosure.

FIGS. 5A-6C illustrate example graphical user interfaces (GUIs) that may be generated on a user device and another computing device according to this disclosure.

FIGS. 8A-8B illustrate additional example GUIs that may be generated on a user device according to this disclosure.

DETAILED DESCRIPTION

Figure 1B:
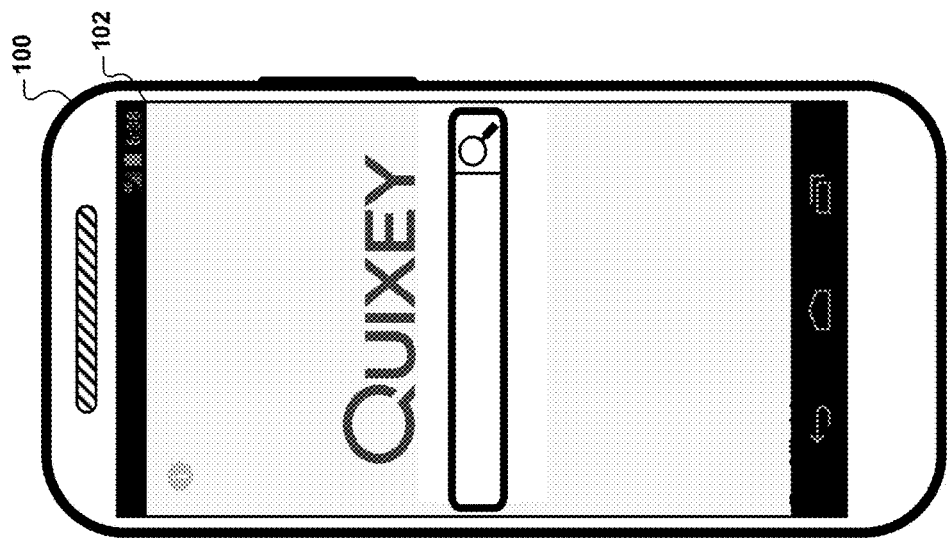
FIGS. 1A-1B illustrate example user devices that may be used to implement the techniques of the present disclosure.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of computing devices, and, more particularly, to techniques for interacting with computing devices equipped with pressure-sensitive displays (e.g., laptops, tablets, smartphones, smart watches, and fitness bands). Specifically, the techniques of this disclosure are directed to computing devices configured to receive inputs from users via pressure-sensitive displays capable of detecting (e.g., sensing) pressure inputs from the users. For example, to receive the pressure inputs, the pressure-sensitive displays may each include one or more of a resistive touchscreen, a push-button-based touchscreen, and another pressure-sensitive sensor or input device. In some examples, the pressure-sensitive displays described herein may also be configured to detect (e.g., sense) other types of inputs from the users, such as finger contact inputs. For instance, to receive the finger contact inputs from the users, the pressure-sensitive displays may each include one or more of a capacitive touchscreen and another finger contact-sensitive sensor or input device.

In general, the techniques described herein may enable users to interact with computing devices that include pressure-sensitive displays in instances where the displays are covered (e.g., obscured from the users' view by one or more layers of clothing or other objects). In particular, the techniques may include receiving a pressure input from a user at a pressure-sensitive display of a user device. The techniques may further include determining that the pressure-sensitive display is covered. For example, determining that the pressure-sensitive display is covered may be performed using the received pressure input and/or other information (e.g., an output of an ambient light sensor included in the user device). In this disclosure, receiving the pressure input and determining that the pressure-sensitive display is covered may be referred to as detecting a "covered user interaction." The techniques may also include, in response to receiving the pressure input and determining that the pressure-sensitive display is covered (e.g., in response to detecting a covered user interaction), performing any of a variety of actions using the user device, as described herein. Using the described techniques may, in some examples, improve the user's experience when interacting with the user device.

As one example, the user device (e.g., a smartphone or a smart watch) may receive one or more user notifications (e.g., text-based notifications, incoming phone calls, or voicemails) from a notification server. In this example, the pressure-sensitive display of the user device may be covered by the user's clothing (e.g., by sleeve or pocket fabric) or other objects, thus preventing the user from viewing the received user notifications. As such, the user device may optionally provide an indication of the user notifications to the user (e.g., via a sound and/or vibration output). Also in this example, in response to receiving the pressure input and determining that the pressure-sensitive display is covered, as described herein, the user device may perform one or more actions with respect to the user notifications. As one example, the user device may provide a text-to-speech or playback output for one or more of the user notifications (e.g., a text-based notification, such as an e-mail or a text message, or a voicemail) to the user. As another example, the user device may enable the user to vocally interact with one or more of the user notifications (e.g., an incoming phone call) at the device. As still another example, the user device may forward one or more of the user notifications to another computing device (e.g., for display, text-to-speech or playback output, and/or vocal interaction by the user).

In additional examples, the user of the user device and/or another user (e.g., a developer of the device or of an application, or "app," included on the device) may determine (e.g., select) the action that the device performs in response to receiving the pressure input and determining that the pressure-sensitive display is covered. For example, the user may configure the user device to be set into a predetermined state (e.g., to launch a software app including a graphical user interface, or "GUI," that enables the user to compose an e-mail or a text message via voice input) in response to receiving the pressure input and determining that the pressure-sensitive display is covered.

In this manner, the techniques described herein may improve a user's experience when using a user device that includes a covered pressure-sensitive display by avoiding the inconvenience associated with the user uncovering the display in order to interact with the device. As one example, as described herein, the techniques may enable the user to perceive (e.g., hear), interact with (e.g., accept incoming phone calls), and/or view (e.g., at another computing device) user notifications received by the user device despite the pressure-sensitive display being covered. As another example, as also described herein, the techniques may further enable the user to interact with the covered pressure-sensitive display to cause the user device to perform other actions (e.g., to set the device into a predetermined state).

Figure 1A:
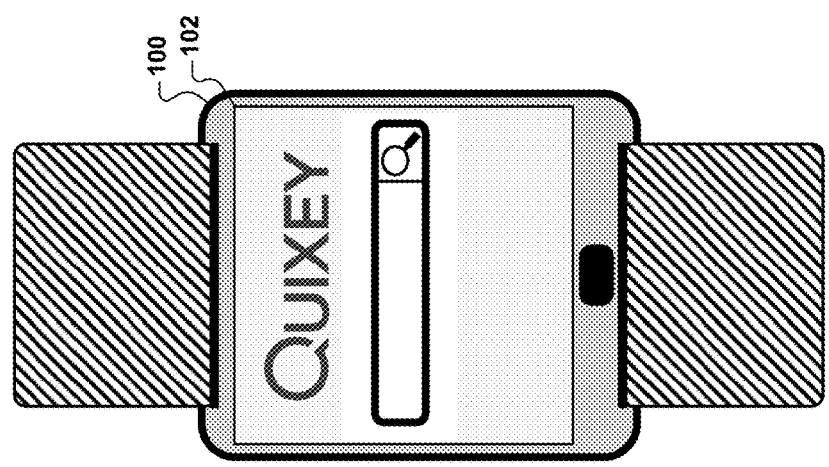

FIGS. 1A-1B illustrate example user devices 100 that may be used to implement the techniques of this disclosure. As shown in FIG. 1A, the user device 100 may be a smart watch computing device configured to be worn around a user's wrist and capable of being covered by the user's shirt sleeve. Alternatively, as shown in FIG. 1B, the user device 100 may be a smartphone computing device configured to be held in a user's hand and capable of being stored in the user's pocket. In other examples, the user device 100 may be a tablet, a laptop computer, or a desktop computer. In still other examples, the user device 100 may be a computing device having another form factor, such as a computing device included in a vehicle, a gaming device, a television, or another appliance (e.g., a networked home automation device or appliance). In general, the user device 100 of this disclosure may be any computing device that includes a pressure-sensitive display 102 configured to receive pressure inputs (e.g., a display that includes a resistive or push-button-based touchscreen) from users of the device 100, as described herein. In other words, the pressure-sensitive display 102 may be configured to receive pressure inputs having any non-zero amount of pressure, or force per unit of area, from the users using any of one or more fingers of the users' hands, other parts of the users' bodies, and other objects that are not part of the users' bodies (e.g., styli), irrespective of whether the body part or object used is electrically conductive. Additionally, or alternatively, the pressure-sensitive display 102 may be configured to receive the pressure inputs from the users via an accelerometer sensor included in the user device 100 that detects force (e.g., in the form of so-called finger "taps," or shaking) applied to the display 102 using fingers of the users' hands, other parts of the users' bodies, and/or other objects that are not part of the users' bodies, also irrespective of the body part or object used being electrically conductive. In other words, the accelerometer sensor may provide an output that indicates a pressure input received at the pressure-sensitive display 102. In further examples, as described herein, the pressure-sensitive display 102 may also be configured to receive finger contact inputs (e.g., the display 102 may include a capacitive touchscreen configured to detect user finger contact, such as finger taps and so-called finger "swipes"). For example, the pressure-sensitive display 102 may be configured to receive finger contact inputs, which may or may not include a pressure or force component, from the users using any of fingers of the users' hands, other parts of the users' bodies (e.g., portions of the users' palms), and other objects that are not part of the users' bodies (e.g., conductive styli), so long as the body parts or objects used are substantially electrically conductive.

The user device 100 may use various different operating systems or platforms. In examples where the user device 100 is a mobile device (e.g., a smart watch or a smartphone), the device 100 may operate using an operating system (OS) such as ANDROID® by Google Inc., IOS® by Apple Inc., or WINDOWS PHONE® by Microsoft Corporation. In examples where the user device 100 is a laptop or desktop computer, the device 100 may use an OS such as MICROSOFT WINDOWS® by Microsoft Corporation, MAC OS® by Apple Inc., or LINUX® (LINUX is the registered trademark of Linus Torvalds in the U.S. and other countries). The user device 100 may also interact with users and/or other devices or systems using operating systems other than those described herein, whether presently available or developed in the future.

FIGS. 2A-2D are conceptual diagrams of example user interactions with pressure-sensitive displays 102 of user devices 100, consistent with the techniques of this disclosure. The user device 100 depicted in FIG. 2A is a smart watch computing device. The user device 100 of FIG. 2A includes a pressure-sensitive display 102 capable of receiving pressure inputs 206 from users of the device 100. In particular, as shown in FIG. 2A, the pressure-sensitive display 102 may be configured to detect (e.g., sense) a pressing motion of one or more of a user's fingers, another part of the user's body, or an object that is not part of the user's body with respect to the display 102. For instance, the pressing motion may be in a direction that is substantially inward with respect to the pressure-sensitive display 102 and the user device 100 (e.g., substantially into a plane of the display 102 and in a direction that is substantially orthogonal to the plane). In other words, the pressing motion may be substantially within a Z-axis relative to an X-Y plane defined by the surface of the display 102 and directed substantially toward the display 102.

In some examples, the pressure-sensitive display 102 may be configured to detect a momentary pressing motion, or a push, lasting a relatively short time. In other examples, the pressure-sensitive display 102 may be configured to detect pressing motions lasting a specified duration of time (e.g., to filter out errant or inadvertent presses on, or so-called "bumps" against, the user device 100). In further examples, the pressure-sensitive display 102 may be configured to detect the pressing motion irrespective of the amount of pressure used. In other examples, the pressure-sensitive display 102 may be configured to detect pressing motions having at least a specified threshold amount of pressure (e.g., to filter out errant/inadvertent presses/bumps).

The pressure-sensitive display 102 of the user device 100 shown in FIG. 2A is also capable of receiving finger contact inputs 202 and 204 from the users of the device 100. Specifically, as shown in FIG. 2A, the pressure-sensitive display 102 may be further configured to detect (e.g., sense) a tapping and/or lateral swiping motion of one or more of the user's fingers, another part of the user's body, or a substantially electrically conductive object that is not part of the user's body with respect to the display 102. As one example, the tapping motion may be in a direction that is substantially inward with respect to the pressure-sensitive display 102 and the user device 100, in a similar manner as described with reference to the pressure input 206. In this example, the tapping motion may result in a finger contact with the pressure-sensitive display 102 in a particular area of the display 102 (e.g., at a given point within an X-Y plane defined by the surface of the display 102). For example, the finger contact may provide a small amount of pressure, or provide substantially no pressure, toward the pressure-sensitive display 102. The taping motion may be represented as a single point of finger contact with the pressure-sensitive display 102 (e.g., at an intersection of X- and Y-components 202, 204 described herein), as shown in FIG. 2A. As another example, the lateral swiping motion may be in one or more directions that are each substantially parallel with respect to the pressure-sensitive display 102 and the user device 100 (e.g., substantially parallel to the X-Y plane defined by the surface of the display 102). For example, the lateral swiping motion may be in any direction within the X-Y plane. For instance, the lateral swiping motion may be represented as a motion vector including a combination of an X-component 202 of the motion in the X (e.g., upward/downward) direction and a Y-component 204 of the motion in the Y (e.g., right/left) direction, as also shown in FIG. 2A. In this example, the lateral swiping motion may result in a finger contact with the pressure-sensitive display 102 along a range of distance spanning the display 102, e.g., again without providing a significant amount of pressure, or providing substantially no pressure, toward the display 102. The user device 100 depicted in FIG. 2B is a smartphone computing device and includes the same or similar elements and user interactions as those described with reference to the user device 100 shown in FIG. 2A.

In the examples described herein, the pressure-sensitive display 102 of the user device 100 may be configured to receive any combination of the pressure inputs 206 and finger contact inputs 202, 204 from the users of the device 100 (e.g., as depicted by a so-called "cumulative user input" 200 shown in FIGS. 2A-2D). In some examples, the pressure-sensitive display 102 may receive a pressure input 206 from a user of the user device 100 without also receiving a finger contact input 202, 204 from the user. In these examples, the user device 100 may determine that the pressure-sensitive display 102 is covered (e.g., obscured from the user's view by clothing or another object) by determining that the pressure input 206 does not coincide with any finger contact inputs 202, 204 also received (e.g., substantially contemporaneously with the pressure input 206) from the user at the same display 102. Additionally, or alternatively, the user device 100 may determine that the pressure-sensitive display 102 is covered based on an output received from an ambient light sensor included in the device 100.

FIGS. 2C and 2D illustrate side-views of the user devices 100 described with reference to FIGS. 2A and 2B. As shown in each of FIGS. 2C and 2D, the pressure-sensitive display 102 of the user device 100 receives a pressure input 206 from a user of the device 100. In each of the examples of FIGS. 2C and 2D, the pressure-sensitive display 102 is covered (e.g., obscured from the user's view) by one or more layers of clothing or another object, which may be referred to herein as an obstruction 208. As further shown in each example, the pressure-sensitive display 102 receives the pressure input 206 from the user through the obstruction 208. In other words, the pressure input 206 passes (e.g., is relayed as a mechanical force) from one or more of the user's fingers, another part of the user's body, or an object that is not part of the user's body through the obstruction 208 and reaches the pressure-sensitive display 102. In these examples, although the obstruction 208 may provide some amount of electrical insulation between the user's body part or object used to generate the pressure input 206 and the pressure-sensitive display 102, the display 102 may receive the input 206 from the user irrespective of whether the body part or object used is electrically conductive.

In contrast, as also shown in each of FIGS. 2C and 2D, the pressure-sensitive display 102 does not receive a finger contact input 202, 206 from the user. Stated another way, in instances where the pressure input 206 described herein originates from one or more of the user's fingers, another part of the user's body, or a conductive object that is not part of the user's body, the pressure-sensitive display 102 does not receive a corresponding finger contact input 202, 204 from the user due to the obstruction 208. In these examples, because the obstruction 208 may provide some amount of electrical insulation between the user's body part or object used to generate the finger contact input 202, 204 and the pressure-sensitive display 102, the display 102 may not receive (e.g., the obstruction 208 may block) the input 202, 204, even though the body part or object used is electrically conductive.

Figure 3:
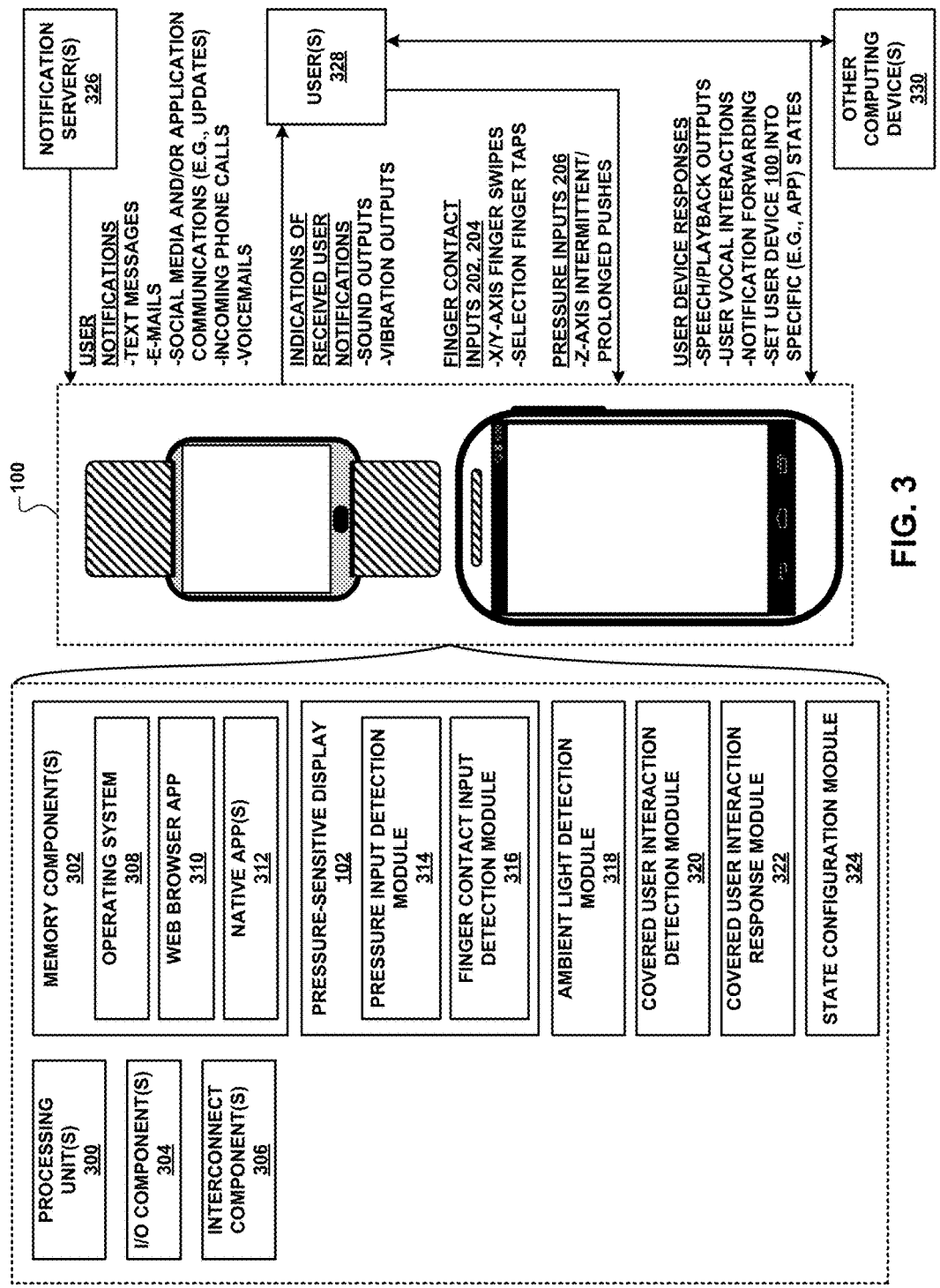
FIG. 3 is a functional block diagram of an example user device in communication with one or more of a notification server, a user, and another computing device.

FIG. 3 is a functional block diagram of an example user device 100 in communication with one or more notification servers 326, users 328, and/or other computing devices 330. As shown in FIG. 3, the user device 100 includes one or more processing units 300, memory components 302, input/output (I/O) components 304, and interconnect components 306. The memory component(s) 302 store an OS 308, a web browser app 310, and one or more native apps 312 (e.g., native apps installed on the user device 100). As also shown, the user device 100 further includes a pressure-sensitive display 102 including a pressure input detection module 314 and a finger contact input detection module 316, an ambient light detection module 318, a covered user interaction detection module 320, a covered user interaction response module 322, and a state configuration module 324. For example, the pressure-sensitive display 102 may correspond to any of a liquid crystal display (LCD), a plasma display, a cathode-ray display, and another display type included in the user device 100. The pressure input detection module 314 may correspond to any of a resistive touchscreen, a push-button-based touchscreen, and another pressure-sensitive sensor or input device and any associated hardware, firmware, and/or software included in the pressure-sensitive display 102. In some examples, the pressure input detection module 314 may correspond to a capacitive touchscreen configured to sense pressure inputs (e.g., via changes in distance and, as a result, capacitance between multiple membranes of the touchscreen due to pressure applied to the touchscreen) any associated hardware, firmware, and/or software included in the pressure-sensitive display 102. The finger contact input detection module 316 may correspond to any of a capacitive touchscreen and another finger contact-sensitive sensor or input device and any associated hardware, firmware, and/or software included in the pressure-sensitive display 102. The ambient light detection module 318 may correspond to any of an ambient light sensor, a video and/or still image camera, and another input device included in the user device 100 (e.g., in the presence-sensitive display 102) and configured to detect an amount of ambient light incident upon the device 100 (e.g., upon the display 102). The covered user interaction detection module 320, covered user interaction response module 322, and state configuration module 324 may each be implemented by the processing unit(s) 300 executing computer-readable instructions stored in the memory component(s) 302, causing the unit(s) 300 to interact with any of the resources described herein with reference to the user device 100, and/or with any of the notification server(s) 326, user(s) 328, and other computing device(s) 330. As described herein, in some examples (not shown), the user device 100 may further include an accelerometer sensor configured to provide outputs that indicate pressure inputs received at (e.g., force applied to) the pressure-sensitive display 102.

The processing unit(s) 300 may be configured to execute instructions stored in the memory component(s) 302 and communicate with the memory component(s) 302 and PO component(s) 304 (e.g., via the interconnect component(s) 306). Each of the OS 308, web browser app 310, and native app(s) 312 may be embodied in computer-executable, or computer-readable, instructions and executed by the processing unit(s) 300. The memory component(s) 302 may further store computer-executable, or computer-readable, instructions associated with (e.g., used to operate) one or more of the pressure-sensitive display 102, pressure input detection module 314, finger contact input detection module 316, ambient light detection module 318, covered user interaction detection module 320, covered user interaction response module 322, and state configuration module 324, which may also be executed by the processing unit(s) 300. The memory component(s) 302 may also be configured to store system parameters and other data. Each of the I/O component(s) 304 may be configured to (e.g., at the direction of the processing unit(s) 300) receive inputs (e.g., user notifications, pressure inputs 206, and/or finger contact inputs 202, 204) to the user device 100 and transmit outputs (e.g., indications of received user notifications, text-to-speech, playback, or vocal interaction outputs, and/or forwarded user notifications) from the device 100. The interconnect component(s) 304 (e.g., a bus) may be configured to provide communication between the processing unit(s) 300, memory component(s) 302, and I/O component(s) 304, as well as among other systems or devices included within the user device 100 and/or located outside of the device 100 (e.g., the notification server(s) 326 and/or other computing device(s) 330).

The units, components, and modules of the user device 100 may enable the device 100 to perform the techniques attributed to the device 100 in this disclosure. For example, the user device 100 (e.g., the processing unit(s) 300 executing instructions stored in the memory component(s) 302) may be configured to receive (e.g., via the I/O component(s) 304) user notifications from the notification server(s) 326 (e.g., via any wireless and/or wired communications networks or protocols), provide (e.g., via the I/O component(s) 304) indications of the received user notifications to the user(s) 328, and receive (e.g., via the I/O component(s) 304) pressure inputs 206 from the user(s) 328 at the pressure-sensitive display 102 (e.g., in response to providing the indications). The user device 100 (e.g., the processing unit(s) 300 executing instructions stored in the memory component(s) 302) may be further configured to determine that the pressure-sensitive display 102 is covered and perform one or more actions, e.g., associated with the user notifications, in response to receiving the pressure inputs 206 and determining that the display 102 is covered.

The processing unit(s) 300 may execute one or more instructions included in the memory component(s) 302 to perform one or more of receiving the user notifications from the notification server(s) 326, providing the indications of the notifications to the user(s) 328, receiving the pressure inputs 206 from the user(s) 328, determining that the pressure-sensitive display 102 is covered, and performing the actions. For example, the processing unit(s) 300 may execute instructions associated with one or more of the OS 308, web browser app 310, native app(s) 312, pressure-sensitive display 102, pressure input detection module 314, finger contact input detection module 316, ambient light detection module 318, covered user interaction detection module 320, covered user interaction response module 322, and state configuration module 324. In a specific example, the processing unit(s) 300 may execute instructions that cause the user device 100 to run the OS 308. To receive the user notifications from the notification server(s) 326 and provide the indications of the received notifications to the user(s) 328, the processing unit(s) 300 may further execute instructions that cause the user device 100 to run one or more of the web browser app 310 and native app(s) 312, e.g., within the OS 308. For example, to provide the indications of the notifications to the user(s) 328, the processing unit(s) 300 may execute instructions that cause the user device 100 to operate a sound and/or vibration output module (not shown). In some examples, to receive the pressure inputs 206 from the user(s) 328, the processing unit(s) 300 may execute instructions that cause the user device 100 to operate the pressure input detection module 314 of the pressure-sensitive display 102. In additional examples, the user device 100 may be further configured to receive finger contact inputs 202, 204 from the user(s) 328, e.g., via the processing unit(s) 300 executing instructions that cause the device 100 to operate the finger contact input detection module 316.

In some examples, to determine that the pressure-sensitive display 102 is covered, the processing unit(s) 300 may execute instructions that cause the user device 100 to operate the covered user interaction detection module 320. As described herein, in some examples, to make this determination, the processing unit(s) 300 may execute instructions that cause the user device 100 to operate the ambient light detection module 318. To perform the actions, e.g., associated with the user notifications, in response to receiving the pressure inputs 206 and determining that the display 102 is covered, the processing unit(s) 300 may execute instructions that cause the user device 100 to operate the covered user interaction response module 322. As a result, as one example, the user device 100 may provide text-to-speech or playback outputs for the user notifications to the user(s) 328. As another example, the user device 100 may enable the user(s) 328 to vocally interact with the user notifications. As still another example, the user device 100 may forward the user notifications (e.g., via any of a wireless and a wired communications network or protocol) to one or more of the (e.g., proximate) other computing device(s) 330, e.g., for display, text-to-speech or playback output, and/or to enable the user(s) 328 to vocally interact with the notifications. As an additional example, the user device 100 may be set into a predetermined state (e.g., of a software app included on the device 100).

Figure 4A:
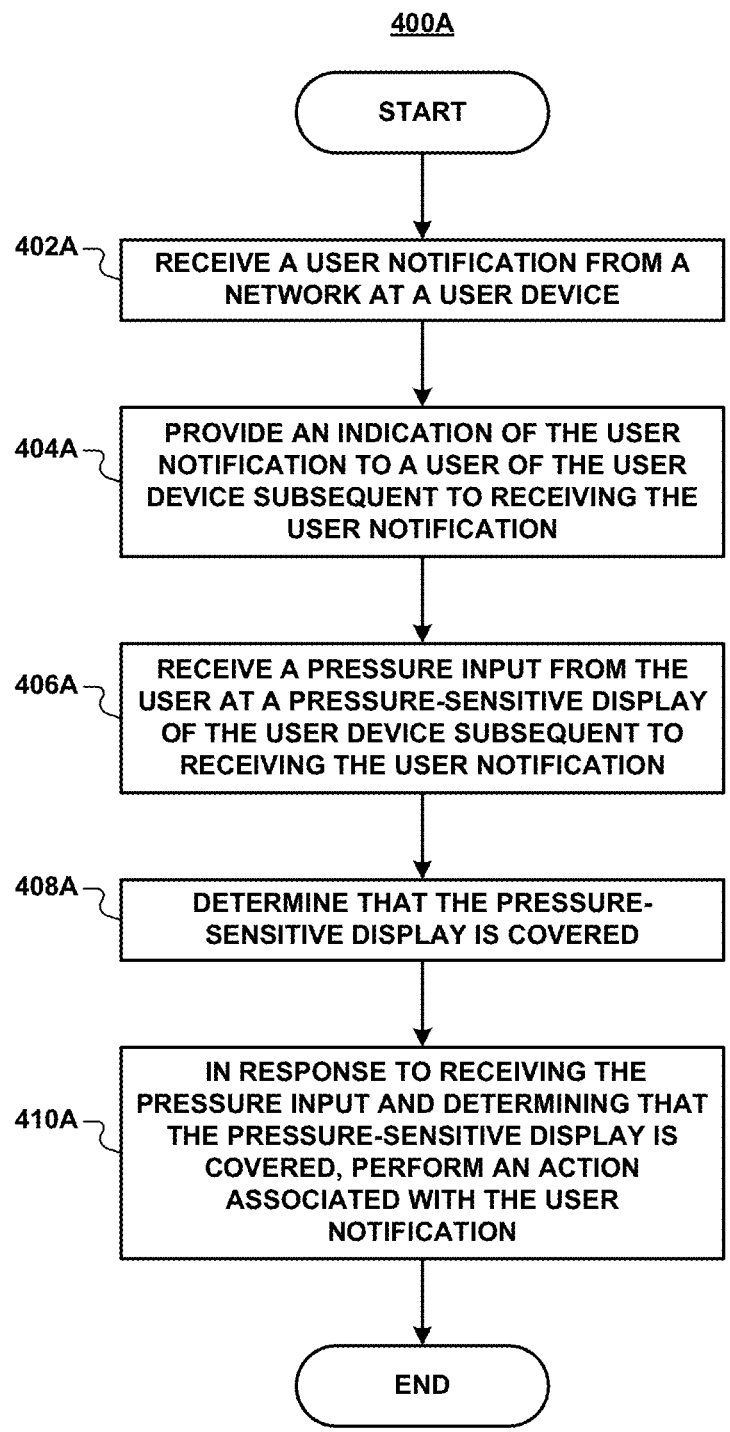
FIGS. 4A-4D are flow diagrams that illustrate example methods for performing an action at a user device in response to receiving a pressure input at a pressure-sensitive display of the device and determining that the display is covered.
Figure 4B:
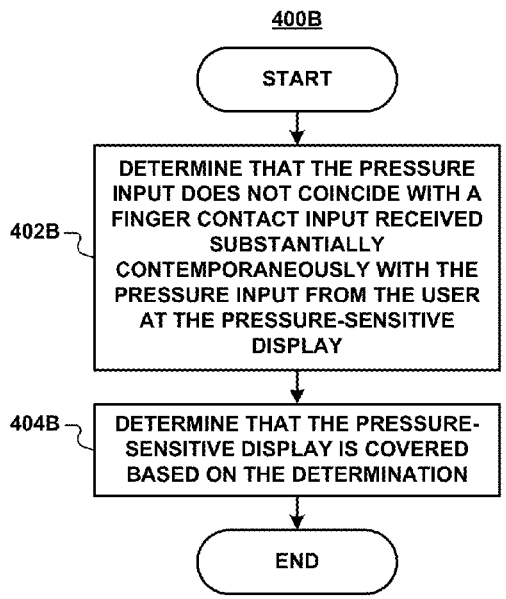
Figure 4C:
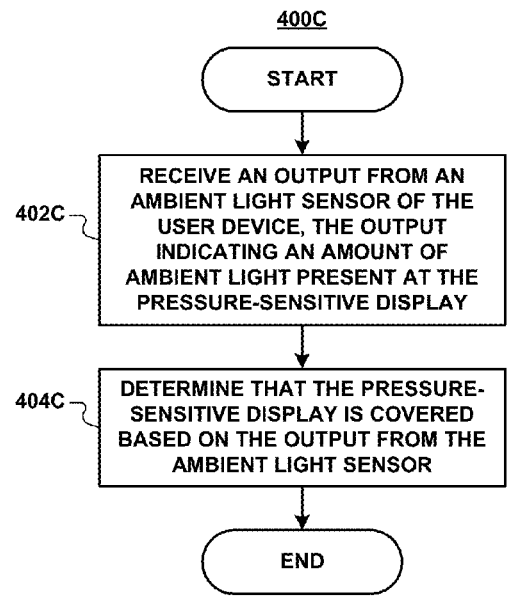
Figure 4D:
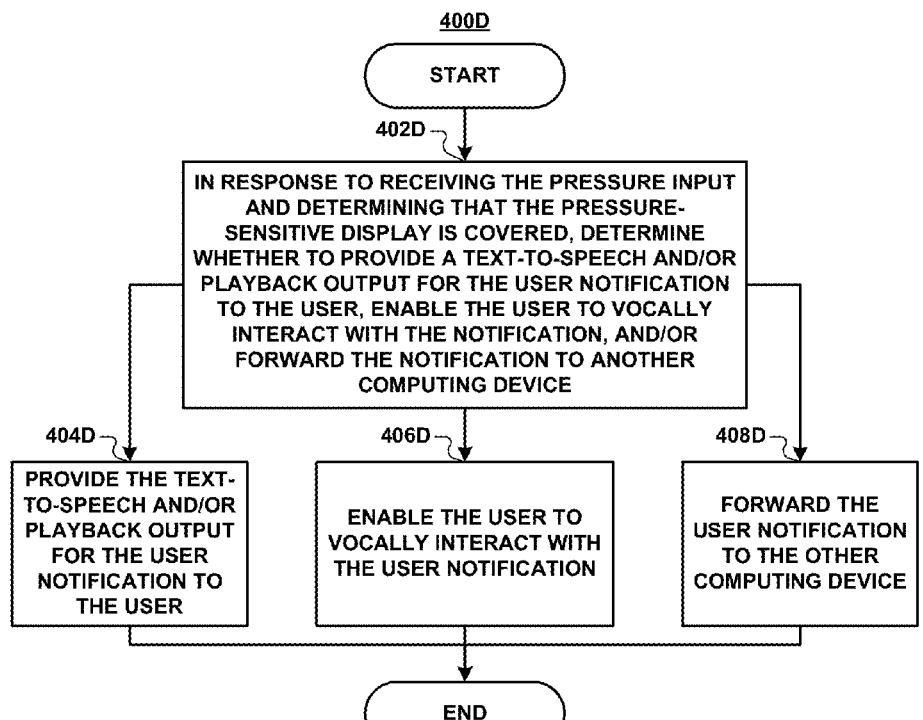

FIGS. 4A-4D are flow diagrams that illustrate example methods 400A-400D, respectively, for performing an action at a user device 100 in response to receiving a pressure input 206 at a pressure-sensitive display 102 of the device 100 and determining that the display 102 is covered. With reference to FIG. 4A, in block 402A, a user device 100 may initially receive a user notification (e.g., a text message, an e-mail, a social media communication or update, an app communication or update, an incoming phone call, or a voicemail) from a network (e.g., via the network from a notification server, such as a cellular telephone service, an e-mail service, a social networking service, or an app programming interface, or "API"). In block 404A, the user device 100 may optionally provide an indication of the received user notification (e.g., a sound and/or vibration output) to a user of the device 100 subsequent to receiving the user notification. In block 406A, the user device 100 may receive a pressure input 206 from the user at a pressure-sensitive display 102 of the device 100 subsequent to receiving the user notification (and, e.g., in response to providing the indication to the user). For example, the user device 100 may allow the user to provide the pressure input 206 within a predefined amount of time after the device 100 provides the indication to the user.

In block 408A, the user device 100 (e.g., the covered user interaction detection module 320) may determine that the pressure-sensitive display 102 is covered. As described herein, the user device 100 determining that the pressure-sensitive display 102 is covered may include the device 100 determining that the display 102 is obscured from the user's view by one or more layers of clothing (e.g., due to the device 100 being located under the user's sleeve or in the user's pocket) or by other objects. For example, the user device 100 may determine that the pressure-sensitive display 102 is covered before, during (e.g., in response to), and/or after receiving the pressure input 206 from the user. As one example, with reference to FIG. 4B, in block 402B, the user device 100 may determine that the pressure input 206 does not coincide with a finger contact input 202, 204 received substantially contemporaneously with the pressure input 206 from the user at (e.g., a capacitive touchscreen included in) the pressure-sensitive display 102 and, in block 404B, determine that the display 102 is covered based on this determination. Additionally (e.g., in combination with the determination described above), or alternatively, with reference to FIG. 4C, in block 402C, the user device 100 may receive an output from an ambient light sensor (or, e.g., a camera, or another input device) of the device 100. In this example, the output may indicate an amount of ambient light present at the pressure-sensitive display 102. In block 404C, the user device 100 may further determine that the pressure-sensitive display 102 is covered based on the output from the ambient light sensor (e.g., determine that the amount of ambient light present at the pressure-sensitive display 102, as indicated by the output, is below a threshold amount).

In block 410A, in response to receiving the pressure input 206 and determining that the pressure-sensitive display 102 is covered, the user device 100 (e.g., the covered user interaction response module 322) may perform an action associated with the user notification. For example, with reference to FIG. 4D, in block 402D, the user device 100 may, in response to receiving the pressure input 206 and determining that the pressure-sensitive display 102 is covered, determine whether to perform one or more of the following actions. As one example, in block 404D, the user device 100 may provide a text-to-speech output (e.g., for text messages, e-mails, and social media and app communications and updates) or a playback output (e.g., for voicemails) for the user notification to the user (e.g., via a speaker transducer of the device 100). As another example, in block 406D, the user device 100 may enable the user to vocally interact with the user notification (e.g., answer an incoming phone call and enable the user to carry on a phone conversation via speaker and microphone transducers of the device 100). As still another example, in block 408D, the user device 100 may forward the user notification to another computing device 330 (e.g., another one of the user's computing devices, such as a smartphone, a car navigation system, a desktop or laptop computer, a television, or another appliance). In this example, the user device 100 may forward the user notification to the other computing device 300 for display or text-to-speech output (e.g., for text messages, e-mails, and social media and app communications and updates), playback (e.g., for voicemails), and/or to enable the user to vocally interact with the notification, in a similar manner as described herein.

FIGS. 5A-5C illustrate example GUIs that may be generated on a user device 100 according to this disclosure. The user device 100 shown in FIGS. 5A-5C is a wrist watch computing device (e.g., a smart watch) including watch straps. Example wrist watch computing devices include the SAMSUNG GALAXY GEAR®, the SAMSUNG GALAXY GEAR® 2, the SAMSUNG GEAR® 2 Neo, and the SAMSUNG GEAR FIT® developed by Samsung Electronics Co., Ltd., as well as the APPLE WATCH® developed by Apple Inc.

As shown in FIG. 5A, the user device 100 receives one or more user notifications (e.g., one or more text messages, e-mails, social media communications or updates, app communications or updates, incoming phone calls, or voicemails) from a notification server 326 (e.g., notifications 1-N, where N is an integer value greater or equal to 1). As also shown, the user device 100 displays the received user notifications at a pressure-sensitive display 102 of the device 100. As described herein, the pressure-sensitive display 102 may be configured to receive pressure inputs 206 from users of the user device 100. As also described herein, the pressure-sensitive display 102 may also be (e.g., may include a capacitive touchscreen) configured to receive finger contact inputs 202, 204 (e.g., finger taps and/or swipes) from the users.

In the example of FIGS. 5A-5C, upon receiving the user notifications, the user device 100 may optionally provide an indication of the notifications to the user. For example, the user device 100 may provide one or more of a sound output (e.g., a tone, a soundbite, or a voice indication) and a vibration output to the user to indicate receipt of the user notifications. As shown in FIG. 5B, e.g., in response to the indication, the user device 100 receives a pressure input 206 from the user at the pressure-sensitive display 102. In this example, the user device 100 further determines that the pressure-sensitive display 102 is covered. As one example, as described herein, the user device 100 may determine that the pressure input 206 does not coincide with any finger contact inputs 202, 204 received substantially contemporaneously with the pressure input 206 at (e.g., the capacitive touchscreen included in) the pressure-sensitive display 102. As another example, as also described herein, the user device 100 may receive an output from an ambient light sensor included in the device 100 and determine that the pressure-sensitive display 102 is covered based on the received output (e.g., based on an amount of ambient light present at the display 102, as indicated by the output, such as an amount that is below a threshold amount). As previously explained, in some examples, the user device 100 may determine that the pressure-sensitive display 102 is covered prior to, during (e.g., in response to), or following receiving the pressure input 206.

As shown in FIG. 5C, upon receiving the pressure input 206 and determining that the pressure-sensitive display 102 is covered, the user device 100 may perform any of a variety of actions. In some examples, as shown in FIG. 5C, the user device 100 may provide a text-to-speech or playback output for the user notifications to the user and/or enable the user to vocally interact with the notification, such as an incoming phone call (e.g., as indicated by the speaker GUI element of FIG. 5C). In other examples, as described herein, the user device 100 may forward the user notification to another computing device 330, e.g., for display, text-to-speech or playback output, and/or to enable the user to vocally interact with the notification.

FIGS. 6A-6C illustrate additional example GUIs that may be generated on a user device 100 according to this disclosure. FIGS. 6A-6B include analogous elements and user interactions as those described with reference to FIGS. 5A-5B. As shown in FIG. 6C, upon determining that the pressure-sensitive display 102 is covered, the user device 100 may forward the user notification to another computing device 330 (e.g., a smartphone), e.g., for display, text-to-speech or playback output, and/or to enable the user to vocally interact with the notification.

Figure 7A:
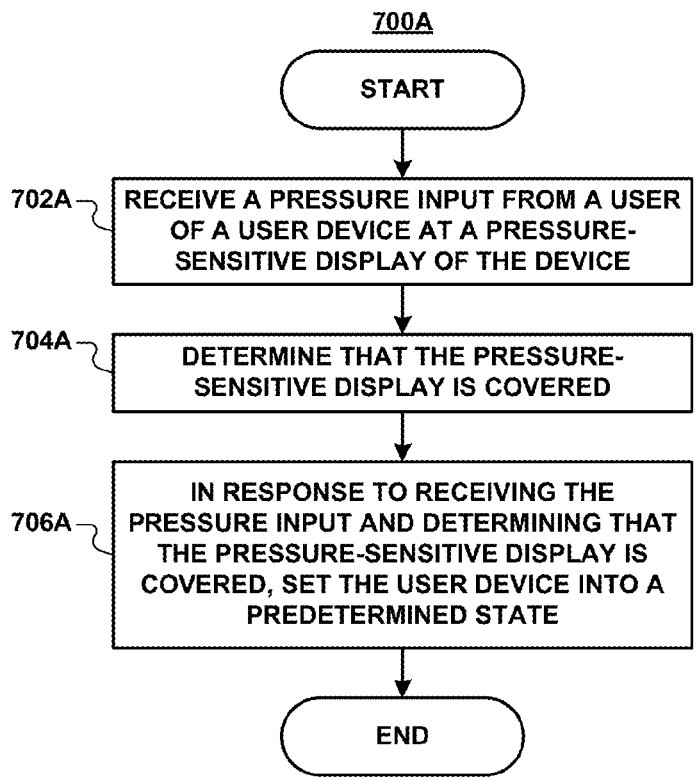
FIGS. 7A-7B are flow diagrams that illustrate other example methods for performing an action at a user device in response to receiving a pressure input at a pressure-sensitive display of the device and determining that the display is covered.
Figure 7B:
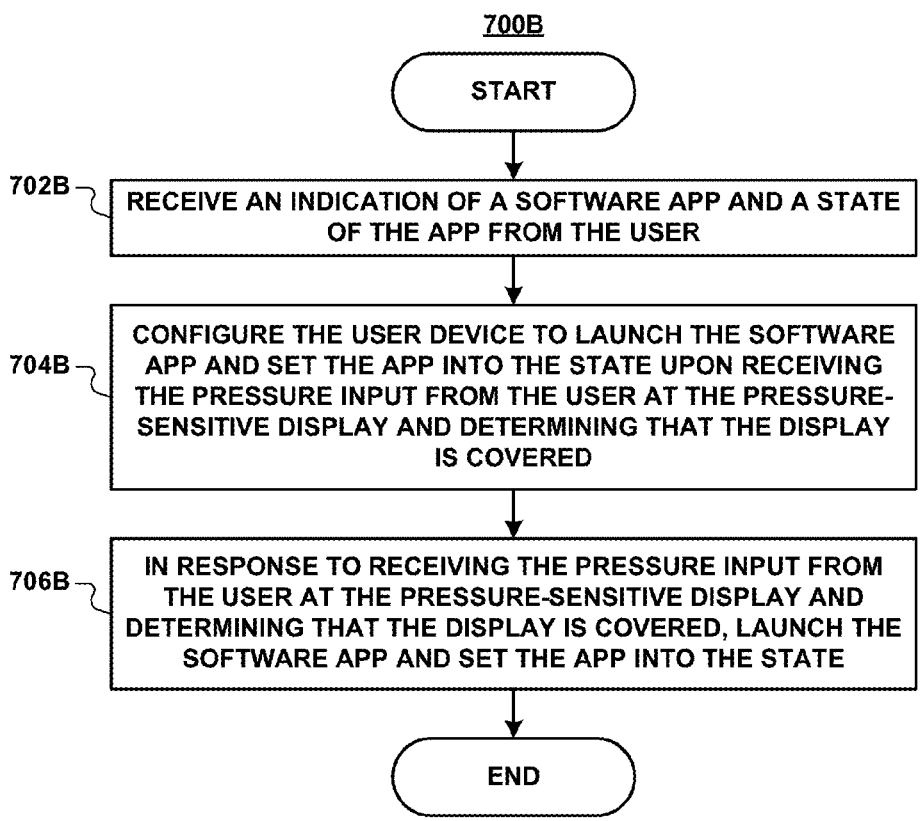

FIGS. 7A-7B are flow diagrams that illustrate other example methods 700A-700B, respectively, for performing an action at a user device 100 in response to receiving a pressure input 206 at a pressure-sensitive display 102 of the device 100 and determining that the display 102 is covered. With reference to FIG. 7A, in block 702A, a user device 100 may initially receive a pressure input 206 from a user of the device 100 at a pressure-sensitive display 102 of the device 100, in a similar manner as described with reference to FIGS. 4A-4C. In block 704A, the user device 100 (e.g., the covered user interaction detection module 320) may determine that the pressure-sensitive display 102 is covered, also in a similar manner as described with reference to FIGS. 4A-4C. In block 706A, in response to receiving the pressure input 206 and determining that the pressure-sensitive display 102 is covered, the user device 100 (e.g., the covered user interaction response module 322) may set the device 100 into a predetermined state.

For example, with reference to FIG. 7B, the user device 100 may initially receive an indication of a software app (e.g., one of the native app(s) 312 included on the device 100, such as a messaging app) and a state (e.g., a GUI, or screen that enables a user to compose and transmit a message) of the app from a user (e.g., the user of the device 100, or another user, such as a developer of the device 100 or of the app). In block 704B, the user device 100 (e.g., the state configuration module 324) may further configure the device 100 to launch the software app and set the app into the state upon receiving the pressure input 206 from the user at the pressure-sensitive display 102 and determining that the display 102 is covered. In block 706B, the user device 100 (e.g., the covered user interaction response module 322) may, in response to receiving the pressure input 206 and determining that the pressure-sensitive display 102 is covered, launch the software app on the device 100 and set the app into the state.

FIGS. 8A-8B illustrate additional example GUIs that may be generated on a user device 100 according to this disclosure. FIGS. 8A-8B include some of the same elements and user interactions as those described with reference to FIGS. 5A-6C. As shown in FIG. 8A, a user device 100 (e.g., a smart watch) receives a pressure input 206 from a user of the device 100 at a pressure-sensitive display 102 of the device 100. In this example, the user device 100 further determines that the pressure-sensitive display 102 is covered, in a similar manner as described with reference to FIGS. 5A-6C. As shown in FIG. 8B, upon receiving the pressure input 206 and determining that the pressure-sensitive display 102 is covered, the user device 100 may be set into a predetermined state (e.g., a particular state of a software app included on the device 100). Specifically, as shown in FIG. 8B, the user device 100 may launch a messaging app included on the device 100 and set the app into a state of the app that enables the user to compose (e.g., via voice input) and transmit a message to a recipient.

The modules, units, and components included in the user device 100 represent features that may be included in the device 100 as it is described in the present disclosure. For example, the processing unit(s) 300, memory component(s) 302, I/O component(s) 304, interconnect component(s) 306, and the various contents thereof may represent features included in the user device 100. Similarly, the pressure-sensitive display 102, ambient light detection module 318, covered user interaction detection module 320, covered user interaction response module 322, state configuration module 324, and the various contents thereof may also represent features included in the user device 100. The modules, units, and components may be embodied by electronic hardware, software, and/or firmware. Depiction of different features as separate modules, units, and components does not necessarily imply whether the modules, units, and components are embodied by common or separate electronic hardware, software, and/or firmware. As such, in some implementations, the features associated with the one or more modules, units, and components depicted herein may be realized by common or separate electronic hardware, software, and/or firmware.

The modules, units, and components may be embodied by electronic hardware, software, and/or firmware components, including one or more processing units, memory components, I/O components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component, or memory, may include any volatile or non-volatile media. For example, the memory may include any electrical media, such as a random access memory (RAM), read-only memory (ROM), non-volatile RAM (NVRAM), electrically-erasable programmable ROM (EEPROM), Flash memory, hard disk drives (HDDs), solid state drives (SSDs), and/or any other memory components. The memory components may include (e.g., store) the data described herein. For example, the memory components may include data (e.g., representing user notifications) used by the user device 100 and/or other data. The memory components may also include instructions that may be executed by the processing units. For example, the memory components may include computer-readable instructions that, when executed by the processing units, cause the units to perform the various functions attributed to the modules, units, and components described herein.

The I/O components may refer to electronic hardware, software, and/or firmware providing communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller) each configured to communicate with a network. In some examples, the I/O components may include hardware, software, and/or firmware configured to communicate with various human interface devices, including (e.g., pressure-sensitive) display screens, keyboards, pointer devices (e.g., a mouse), (e.g., capacitive, resistive, push-button-based, and/or other) touchscreens, speakers, and microphones. In some examples, the I/O components may include hardware, software, and/or firmware configured to communicate with additional devices, such as external memory (e.g., external HDDs).

What is claimed is:

1. A computing device comprising:
   a network interface component;
   a pressure-sensitive display;
   one or more memory components configured to store computer-readable instructions; and
   at least one processor configured to execute the computer-readable instructions, wherein the computer-readable instructions, when executed by the at least one processor, cause the at least one processor to:
      receive a user notification from a network via the network interface component,
      receive a pressure input from a user at the pressure-sensitive display subsequent to receiving the user notification,
      identify that the pressure-sensitive display is covered, and
      in response to receiving the pressure input and identifying that the pressure-sensitive display is covered, perform an action associated with the user notification.

2. The computing device of claim 1, wherein the user notification comprises one or more of a text message, an e-mail, a social media communication, an application communication, an incoming phone call, or a voicemail.

3. The computing device of claim 1,
   wherein the computer-readable instructions further cause the at least one processor to provide an indication of the user notification to the user subsequent to receiving the user notification, the indication comprising one or more of a sound output or a vibration output, and
   wherein the computer-readable instructions that cause the at least one processor to receive the pressure input comprise computer-readable instructions that cause the at least one processor to receive the pressure input subsequent to providing the indication.

4. The computing device of claim 1,
   wherein the pressure-sensitive display is further configured to receive finger contact inputs from the user, and
   wherein the computer-readable instructions that cause the at least one processor to identify that the pressure-sensitive display is covered comprise computer-readable instructions that cause the at least one processor to identify that the pressure input does not coincide with a finger contact input received substantially contemporaneously with the pressure input from the user at the pressure-sensitive display.

5. The computing device of claim 4, wherein the pressure-sensitive display comprises a capacitive touchscreen configured to receive the finger contact inputs from the user.

6. The computing device of claim 1, further comprising an ambient light sensor configured to transmit an output indicating an amount of ambient light present at the pressure-sensitive display,
   wherein the computer-readable instructions that cause the at least one processor to identify that the pressure-sensitive display is covered comprise computer-readable instructions that cause the at least one processor to:
      receive the output from the ambient light sensor, and
      identify that the pressure-sensitive display is covered based on the output.

7. The computing device of claim 1, wherein the computer-readable instructions that cause the at least one processor to perform the action associated with the user notification comprise computer-readable instructions that cause the at least one processor to provide one or more of a text-to-speech output or a playback output for the user notification to the user.

8. The computing device of claim 1, wherein the computer-readable instructions that cause the at least one processor to perform the action associated with the user notification comprise computer-readable instructions that cause the at least one processor to enable the user to vocally interact with the user notification.

9. The computing device of claim 1, wherein the computer-readable instructions that cause the at least one processor to perform the action associated with the user notification comprise computer-readable instructions that cause the at least one processor to forward the user notification to another computing device.

10. The computing device of claim 1, further comprising an accelerometer sensor configured to transmit an output indicating an amount of force applied to the computing device by the user,
wherein the computer-readable instructions that cause the at least one processor to receive the pressure input from the user at the pressure-sensitive display comprise computer-readable instructions that cause the at least one processor to receive the output from the accelerometer sensor.

11. The computing device of claim 1, wherein the computing device comprises one or more of a smartphone computing device, a smart watch computing device, or a fitness band computing device.

12. A computing device comprising:
a pressure-sensitive display;
one or more memory components configured to store computer-readable instructions; and
at least one processor configured to execute the computer-readable instructions, wherein the computer-readable instructions, when executed by the at least one processor, cause the at least one processor to:
receive a pressure input from a user at the pressure-sensitive display,
identify that the pressure-sensitive display is covered, and
in response to receiving the pressure input and identifying that the pressure-sensitive display is covered, set the computing device into a predetermined state, wherein the predetermined state is a state of launching a software application included in the computing device.

13. The computing device of claim 12,
wherein the pressure-sensitive display is further configured to receive finger contact inputs from the user, and
wherein the computer-readable instructions that cause the at least one processor to identify that the pressure-sensitive display is covered comprise computer-readable instructions that cause the at least one processor to identify that the pressure input does not coincide with a finger contact input received substantially contemporaneously with the pressure input from the user at the pressure-sensitive display.

14. The computing device of claim 12, further comprising an ambient light sensor configured to transmit an output indicating an amount of ambient light present at the pressure-sensitive display,
wherein the computer-readable instructions that cause the at least one processor to identify that the pressure-sensitive display is covered comprise computer-readable instructions that cause the at least one processor to:
receive the output from the ambient light sensor, and
identify that the pressure-sensitive display is covered based on the output.

15. The computing device of claim 12, further comprising an accelerometer sensor configured to transmit an output indicating an amount of force applied to the computing device by the user,
wherein the computer-readable instructions that cause the at least one processor to receive the pressure input from the user at the pressure-sensitive display comprise computer-readable instructions that cause the at least one processor to receive the output from the accelerometer sensor.

16. The computing device of claim 12, wherein the computer-readable instructions that cause the at least one processor to set the computing device into the predetermined state comprise computer-readable instructions that cause the at least one processor to launch the software application on the computing device and set the software application into a state of the software application.

17. The computing device of claim 16, wherein the computer-readable instructions further cause the at least one processor to:
receive an indication of the software application and the state from the user, and
configure the computing device to launch the software application and set the software application into the state in response to receiving the pressure input from the user at the pressure-sensitive display and identifying that the pressure-sensitive display is covered.

18. A non-transitory storage medium having stored therein instructions which cause, when executed by at least one processor, the at least one processor to perform at least one operation which comprises:
receiving a user notification from a network at a user device;
receiving a pressure input from a user of the user device at a pressure-sensitive display of the user device subsequent to receiving the user notification;
identifying that the pressure-sensitive display is covered using the user device; and
in response to receiving the pressure input and identifying that the pressure-sensitive display is covered, performing an action associated with the user notification using the user device.

19. The non-transitory storage medium of claim 18, wherein the at least one operation further comprises providing an indication of the user notification to the user using the user device subsequent to receiving the user notification, the indication comprising one or more of a sound output or a vibration output,
wherein the receiving of the pressure input comprises receiving the pressure input subsequent to providing the indication.

20. The non-transitory storage medium of claim 18, wherein the identifying that the pressure-sensitive display is covered comprises identifying that the pressure input does not coincide with a finger contact input received substantially contemporaneously with the pressure input from the user at a capacitive touchscreen included in the pressure-sensitive display.

21. The non-transitory storage medium of claim 18, wherein the identifying that the pressure-sensitive display is covered comprises:
receiving an output from an ambient light sensor of the user device, the output indicating an amount of ambient light present at the pressure-sensitive display; and
identifying that the pressure-sensitive display is covered based on the output.

22. The non-transitory storage medium of claim 18, wherein the action associated with the user notification comprises one or more of:
- providing one or more of a text-to-speech output or a playback output for the user notification to the user;
- enabling the user to vocally interact with the user notification; or
- forwarding the user notification to a computing device other than the user device.

23. The non-transitory storage medium of claim 18, wherein the receiving of the pressure input from the user at the pressure-sensitive display comprises receiving an output from an accelerometer sensor of the user device, the output indicating an amount of force applied to the user device by the user.

24. A non-transitory storage medium having stored therein instructions which cause, when executed by at least one processor, the at least one processor to perform at least one operation which comprises:
- receiving a pressure input from a user of a user device at a pressure-sensitive display of the user device;
- identifying that the pressure-sensitive display is covered using the user device; and
- in response to receiving the pressure input and identifying that the pressure-sensitive display is covered, setting the user device into a predetermined state,
- wherein the predetermined state is a state of launching a software application included in the user device.

25. The non-transitory storage medium of claim 24, wherein the identifying that the pressure-sensitive display is covered comprises identifying that the pressure input does not coincide with a finger contact input received substantially contemporaneously with the pressure input from the user at a capacitive touchscreen included in the pressure-sensitive display.

26. The non-transitory storage medium of claim 24, wherein the identifying that the pressure-sensitive display is covered comprises:
- receiving an output from an ambient light sensor of the user device, the output indicating an amount of ambient light present at the pressure-sensitive display; and
- identifying that the pressure-sensitive display is covered based on the output.

27. The non-transitory storage medium of claim 24, wherein the receiving of the pressure input from the user at the pressure-sensitive display comprises receiving an output from an accelerometer sensor of the user device, the output indicating an amount of force applied to the user device by the user.

28. The non-transitory storage medium of claim 24, wherein the setting of the user device into the predetermined state comprises launching the software application on the user device and setting the software application into a state of the software application.

* * * * *